US011660673B2

(12) United States Patent
Hafner et al.

(10) Patent No.: US 11,660,673 B2
(45) Date of Patent: May 30, 2023

(54) ADDITIVELY MANUFACTURED OBJECT USING MASK OVER OPENING FOR COATING

(71) Applicant: General Electric Company, Schenectady, NY (US)

(72) Inventors: Matthew Troy Hafner, Honea Path, SC (US); Christopher Donald Porter, Greenville, SC (US); Zachary John Snider, Simpsonville, SC (US); Jeffrey Clarence Jones, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 17/073,565

(22) Filed: Oct. 19, 2020

(65) Prior Publication Data

US 2022/0118514 A1 Apr. 21, 2022

(51) Int. Cl.
*B33Y 80/00* (2015.01)
*B05B 12/26* (2018.01)
(Continued)

(52) U.S. Cl.
CPC .............. *B22F 10/00* (2021.01); *B05B 12/26* (2018.02); *B22F 3/1007* (2013.01); *B22F 3/24* (2013.01);
(Continued)

(58) Field of Classification Search
CPC ......... B05B 12/16–12/40; B05B 12/26; B33Y 80/00; C21D 7/06; F01D 5/288; B23P 2700/06
See application file for complete search history.

(56) References Cited

U.S. PATENT DOCUMENTS

| 4,743,462 A | 5/1988 | Radzavich et al. |
| 5,985,122 A | 11/1999 | Conner |

(Continued)

FOREIGN PATENT DOCUMENTS

| EP | 1835045 A1 * | 9/2007 | ............... C23C 4/01 |
| EP | 3888822 A1 | 10/2021 |

(Continued)

OTHER PUBLICATIONS

European Search Report issued in connection with corresponding PCT Application No. PCT/US2021/071868, dated Feb. 24, 2022, 20 pages.

(Continued)

*Primary Examiner* — Anthony J Zimmer
*Assistant Examiner* — Sean P. O'Keefe
(74) *Attorney, Agent, or Firm* — James Pemrick; Charlotte Wilson; Hoffman Warnick LLC

(57) ABSTRACT

An additively manufactured (AM) object may include a body including an opening in an exterior surface thereof, the opening having a shape and a first area at the exterior surface of the body. A mask may be positioned over the opening. The mask has the shape of the opening and a second area that is larger than the first area so as to overhang the exterior surface of the body about the opening. A plurality of support ligaments couple to the mask and the exterior surface of the body at a location adjacent to the opening to support a portion of the mask. A coating can be applied to the object, and the mask removed. The final AM object includes a plurality of ligament elements extending from the exterior surface of the body and through the coating adjacent the opening, each ligament element at least partially surrounded by the coating.

15 Claims, 7 Drawing Sheets

(51) Int. Cl.
  B22F 10/00 (2021.01)
  B22F 3/10 (2006.01)
  B22F 3/24 (2006.01)
  B22F 10/28 (2021.01)
  B33Y 10/00 (2015.01)
  B33Y 40/20 (2020.01)
  B22F 10/47 (2021.01)
  F01D 5/28 (2006.01)

(52) U.S. Cl.
  CPC .............. *B22F 10/28* (2021.01); *B33Y 80/00* (2014.12); *B22F 10/47* (2021.01); *B22F 2003/1046* (2013.01); *B22F 2003/242* (2013.01); *B22F 2201/03* (2013.01); *B22F 2201/10* (2013.01); *B23P 2700/06* (2013.01); *B33Y 10/00* (2014.12); *B33Y 40/20* (2020.01); *F01D 5/288* (2013.01)

(56) References Cited

U.S. PATENT DOCUMENTS

| | | |
|---|---|---|
| 8,661,826 B2 | 3/2014 | Garry et al. |
| 9,551,058 B2 | 1/2017 | Reid et al. |
| 9,845,703 B2 | 12/2017 | Baummer et al. |
| 10,100,668 B2 | 10/2018 | Bromberg et al. |
| 10,272,461 B2 | 4/2019 | Coskun et al. |
| 2014/0141174 A1 | 5/2014 | Garry et al. |
| 2015/0079288 A1* | 3/2015 | Sordelet .................. B05B 12/26 118/505 |
| 2017/0129013 A1 | 5/2017 | Bunker |
| 2018/0281006 A1 | 10/2018 | Coskun et al. |
| 2019/0337056 A1 | 11/2019 | El Naga et al. |

FOREIGN PATENT DOCUMENTS

| | | |
|---|---|---|
| GB | 2461898 B | 1/2010 |
| WO | 2021050454 A1 | 3/2021 |

OTHER PUBLICATIONS

IPEA/US Written Opinion issued in connection with corresponding PCT Application No. PCT/US2021/071868, dated Dec. 23, 2022, 7 pages.

* cited by examiner

ADDITIVELY MANUFACTURED OBJECT USING MASK OVER OPENING FOR COATING

TECHNICAL FIELD

The disclosure relates generally to manufacturing objects, and more particularly, to additively manufacturing an object with a mask for an opening in an exterior surface of the object, for example, to prevent a coating from entering the opening. Remnants of support ligaments of the mask remain in the coating on the object.

BACKGROUND

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the component. Accordingly, many industrial parts such as turbine rotor blades are preferably made by additive manufacturing.

Subsequent to formation by additive manufacturing, the objects may be further processed. In one example, the object may be exposed to a shot peening in which the surface of the object is bombarded with a peening material such as metal shot. In another example, the object may be coated with a protective layer to protect the underlying material thereof from the harsh environments in which the object is used. For example, a thermal barrier coating (TBC) may be applied to an outer surface of a turbine rotor blade to protect the blade from high temperatures during use.

Some objects may include openings in an exterior surface thereof that need to be protected during the post-print (or post-machining) processing. For example, a turbine rotor blade may include a variety of internal cooling circuits that vent to an exterior surface through cooling passages, i.e., openings in the exterior surface of the blade. The cooling passages may be provided to cool the internal structure where they are present, and/or create a cooling film across the outer surface of the blade.

A variety of mechanisms are employed to protect the openings. In some cases, removable material such as plugs may be provided in the openings to, for example, prevent them from being filled as a coating is applied thereover. The removable material blocks the coating from entering the openings, but increases manufacturing time and complexity because the removable material and/or the coating must ultimately be removed. For example, each opening must have the blocking material removed, which can be time consuming. Furthermore, the coating is typically applied over the blocking material, but needs to be removed from over the blocking material to expose the blocking material and/or the openings. Because the coating bridges over the blocking material, removal of the coating can cause cracking in the adjacent coating, e.g., a TBC, which may render the object unusable or require extensive additional processing. Removal of blocking material after a coating process can be especially challenging where the blocking material is seized with the object's material by the process. Other approaches employ shielding features that are welded on to protect the openings. In this latter case, the labor hours to cover every opening can be substantial.

BRIEF DESCRIPTION

An aspect of the disclosure provides an additively manufactured (AM) structure, comprising: an object including a body including an opening in an exterior surface thereof, the opening having a shape and a first area at the exterior surface of the body; a mask positioned over the opening and having the shape of the opening, the mask having a second area that is larger than the first area so as to overhang the exterior surface of the body about the opening; and a plurality of support ligaments, each support ligament coupled to the mask and the exterior surface of the body at a location adjacent to the opening to support a portion of the mask.

Further aspects of the disclosure provide an additively manufactured (AM) object, comprising: a body including an opening in an exterior surface thereof, the opening having a shape and a first area at the exterior surface of the body; a coating on the exterior surface of the body; and a plurality of ligament elements extending from the exterior surface of the body and through the coating adjacent the opening, each ligament element at least partially surrounded by the coating.

Another aspect of the disclosure provides a method, comprising: additively manufacturing an object, the object including: a body including an opening in an exterior surface of the body, the opening having a shape and a first area at the exterior surface of the body; a mask positioned over the opening and having the shape of the opening, the mask having a second area that is larger than the first area so as to overhang the exterior surface of the body about the opening; and a plurality of support ligaments, each support ligament coupled to the mask and the exterior surface of the body at a location adjacent to the opening to support a portion of the mask; applying a coating over the exterior surface of the body including the mask, wherein the coating does not span an entirety of a gap from an underside of the mask to the exterior surface of the body; and removing the mask, wherein a portion of at least one of the plurality of support ligaments is in an exterior surface of the coating.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
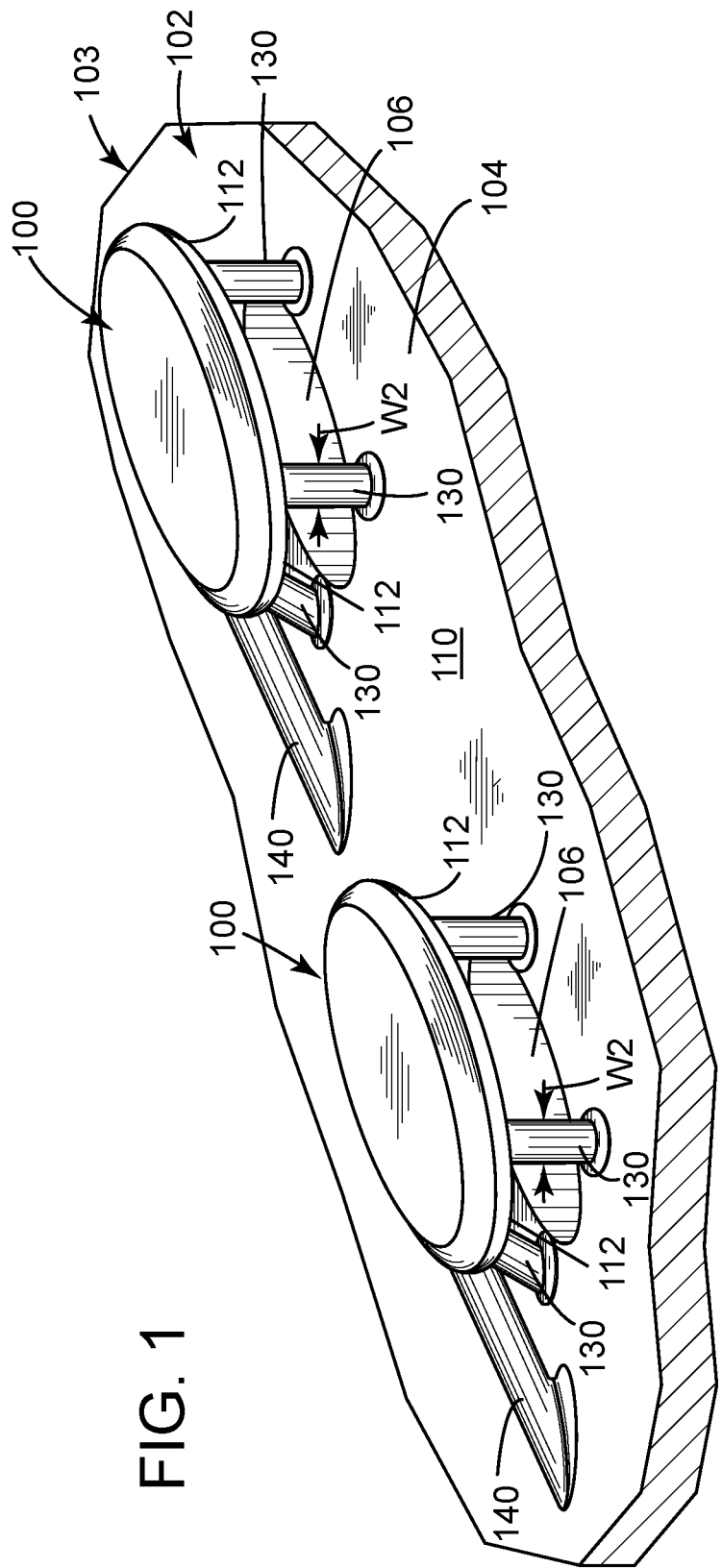
FIG. 1 shows a perspective view of an additively manufactured structure including a mask for an additively manufactured object, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part or object may include and be referenced in another context as consisting of multiple components. Alternatively, what may be described herein as including multiple components may be referred to elsewhere as a single part or object.

It is often required to describe parts that are disposed at differing linear positions with regard to a position. The term "distal" refers to a locale or part of a thing that is more distant than the "proximal" locale or part of the same thing. For example, a distal end of a thing is farther away from a proximal end of the same thing. The terms thus provide general positioning relative to one another. In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Many iron-, cobalt-, and nickel-based superalloy materials traditionally used to fabricate a variety of industrial objects, e.g., the majority of combustion turbine components used in the hot gas path section of the combustion turbine engine, are insulated from the hot gas flow by coating the components with protective coatings in order to survive long term operation in an aggressive high temperature combustion environment. Protective coatings include, but are not limited to, thermal barrier coatings (TBC), bond coats, environmental barrier coatings (EBC), combinations thereof, and other coatings now known or hereinafter developed. Protective coatings can be produced by a multi-step process that includes coating surfaces requiring a protective coating for example with a bond coat and subsequent additional coats, dependent on the intended use of the turbine component and the environment associated with the use.

TBCs are highly advanced material systems. These coatings serve as protective coatings to insulate the components from large and prolonged heat loads by utilizing thermally insulating materials that can sustain an appreciable temperature difference between the load bearing alloys and the coating surface. In doing so, these coatings can allow for higher operating temperatures while limiting the thermal exposure of structural components, extending component life by reducing oxidation and thermal fatigue. TBCs are applied by various methods to a turbine component. Spraying is often used to apply a TBC (or other coating). Illustrative spray application processes include, but are not limited to, plasma spraying both in air and vacuum, cold spraying, electrostatic spraying, electron beam physical vapor disposition, chemical vapor deposition, thermal spraying, high-velocity oxy-fuel coating, physical vapor disposition, combinations thereof, and other spraying techniques now known or hereinafter developed.

One post processing/formation coating outcome that should be avoided is "bridging," which is when subsequent post formation coating processes create a continuous layer from the surface of the part to the cover. Bridging can be caused when the TBC layer thickness is greater than the distance from the part surface to the cover. If too much coating material is present, the cover may be completely covered by TBC with no airgap remaining between it and the part surface. When the cover is removed, the adjacent TBC coating can crack or chip away, reducing its overall lifespan.

Of course, for maintaining the expected function of the cooling holes, bridging should be kept controlled and eliminated, if possible.

Shadowing produces thin and poor quality coatings. The "shadowing" effect of spray (for example but not intended to limit the embodiments, TBC) happens as it deposits on the object while the line of sight of the plasma spray to the surface of the part is partially or totally blocked. The shadowing effect may be best visualized by placing an object in front of a light source and observing the shadow cast by that object. Light rays passing around the object is representative of spray being deposited, while the shadow cast by the object is representative of a void in the deposited spray. Thin coatings have higher than expected operating temperatures that can lead to premature failure. Coating particles that are deflected off a nearby structure do not adhere as well as particles deposited in direct line-of-sight that can cause premature failure. Thus, re-work may be needed to re-coat at locations (where coating is not rigorously bonded or adhered to the component or substrate), which may prolong processing time, require further resources, and may cause lost opportunity costs, and the like.

Openings (such as cooling holes) that are too small or too close to each other can be coated over as coating can build upon itself and completely block the holes. At these holes, coating can block openings.

As indicated above, the disclosure provides an additively manufactured (AM) structure including an object having a body including an opening in an exterior surface thereof. The opening has a shape and a first area at the exterior surface of the body. A mask may be positioned over the opening. The mask has the shape of the opening and a second area that is larger than the first area so as to overhang the exterior surface of the body about the opening. A plurality of support ligaments couple to the mask and the exterior surface of the body at a location adjacent to the opening to support respective portions of the mask. A coating can be applied to the object. The mask is removable from the object by breaking of the support ligaments, rather than machined off. The final additive manufactured object includes the body including the opening in the exterior surface, and the coating on the exterior surface of the body. A plurality of ligament elements, i.e., remnants of the support ligaments, extend from the exterior surface of the body and through the coating adjacent the opening. Each ligament element is at least partially surrounded by the coating. A detachment member may be provided to certain embodiments to allow easy removal of the mask from the object. A mask according to embodiments of the disclosure thus may protect each individual opening from bridging and clogging during the coating (or peening) processes in a highly customized manner, and allows for easy removal of the mask. The masks thus reduce the time to cover the openings prior to coating/peening, and reduces the time to clean out the openings.

Referring to FIG. 1, a perspective view of a mask 100 for an additively manufactured object 102 (hereinafter "object 102") according to certain embodiments of the disclosure is illustrated. Mask 100 and object 102 may be formed using any appropriate additive manufacturing technique for the object material, and collectively may constitute an additive manufacture (AM) structure 103. Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component, e.g., object 102 and mask 100, to be formed, electronically slicing the component into layers, e.g., 18-102 micrometers thick, and creating a file with a two-dimensional image of each layer, including vectors, images or coordinates. The file may then be loaded into a preparation software system that interprets the file such that the structure, e.g., mask 100 and object 102, can be built by different types of additive manufacturing systems. In 3D printing, rapid prototyping (RP), and direct digital manufacturing (DDM) forms of additive manufacturing, material layers, e.g., plastics or ceramics, are selectively dispensed to create the component, e.g., by laying the material layer after layer. In contrast, in metal powder additive manufacturing techniques, such as direct metal laser melting (DMLM) (also referred to as selective laser melting (SLM)), metal powder layers are sequentially melted together to form the part. More specifically, a metal power bed is provided within a processing chamber. A flow of a gas mixture is controlled within the processing chamber from a source of inert gas and a source of oxygen containing material. Fine metal powder layers are sequentially melted on the metal powder bed to generate the object, i.e., after being uniformly distributed using an applicator on a metal powder bed. Each applicator includes an applicator element in the form of a lip, brush, blade or roller made of metal, plastic, material, carbon fibers or rubber that spreads the metal powder evenly over the build platform. The metal powder bed can be moved in a vertical axis. As noted, the process takes place in a processing chamber having a precisely controlled atmosphere. Once each layer is created, each two dimensional slice of the component geometry can be fused by selectively melting the metal powder. The melting may be performed by a high powered melting beam(s), such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the component is completely formed. In one non-limiting example, mask 100 and object 102 may be formed by DMLM or SLM for a metal part, or 3D printing for a ceramic part.

In the FIG. 1 embodiment, object 102 includes a body 104 including an opening 106 in an exterior surface 110 of object 102. Any number of openings 106 may be provided. Object 102 may include any now known or later developed industrial part. In one non-limiting example, object 102 may include a turbine rotor blade that includes a variety of internal cooling circuits that vent to exterior surface 110 of the blade through cooling passages. The cooling passages may be provided to cool the internal structure where they are present, and/or create a cooling film across exterior surface 110 of object 102. Although shown as in a planar exterior surface 110, openings 106 may be positioned in a pedestal (not shown) in exterior surface 110 of the object extending from the surface of the object.

Figure 4:
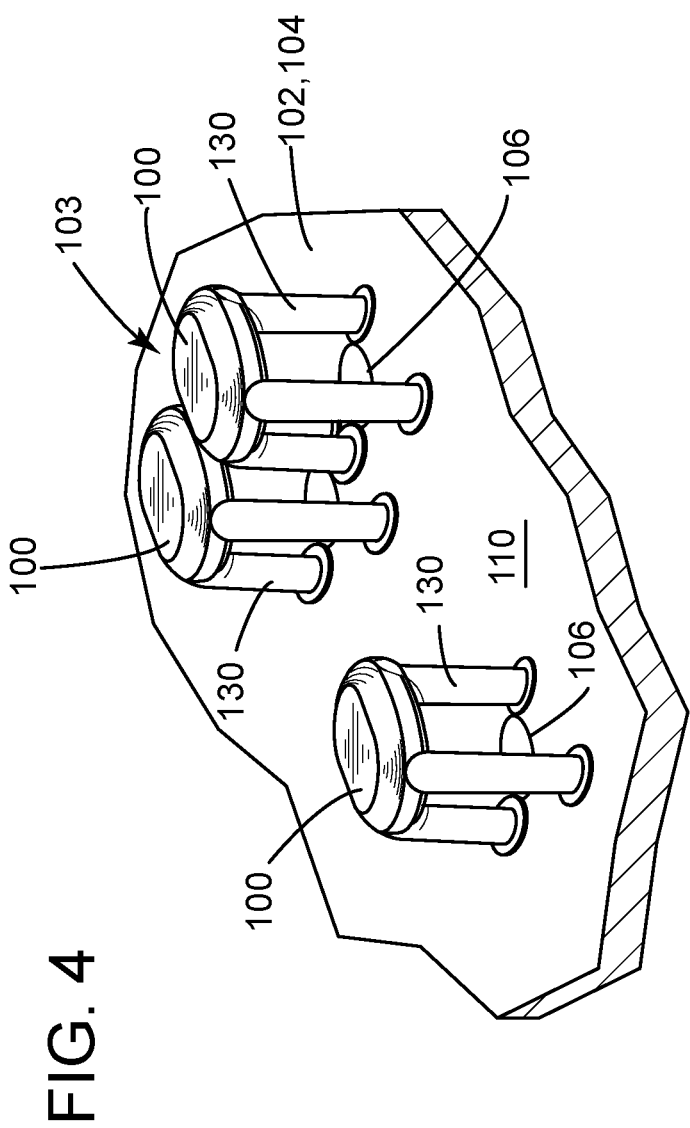
FIG. 4 shows a perspective view of an additively manufactured structure including a mask, according to other embodiments of the disclosure.

Opening(s) 106 may have any cross-sectional shape at exterior surface 110, e.g., elliptical or oval (FIG. 1), circular (FIGS. 4-5), polygonal (FIG. 5) (square, rectangular, trapezoidal, etc.), diffuser shaped (FIG. 5), etc. Opening(s) 106 may extend into object 102 in any direction relative to exterior surface 110. Opening(s) 106 may be positioned in any manner on exterior surface 110 of object 102, e.g., in a line. Opening(s) 106 may be positioned across exterior surface 110 in a spaced manner, e.g., equidistant or not equidistant. Any number of masks 100 may be employed depending on, for example, whether all openings 106 are to be covered or just select openings 106. Each opening 106 has an area, i.e., a cross-sectional area, at exterior surface 110 of body 104.

Figure 2:
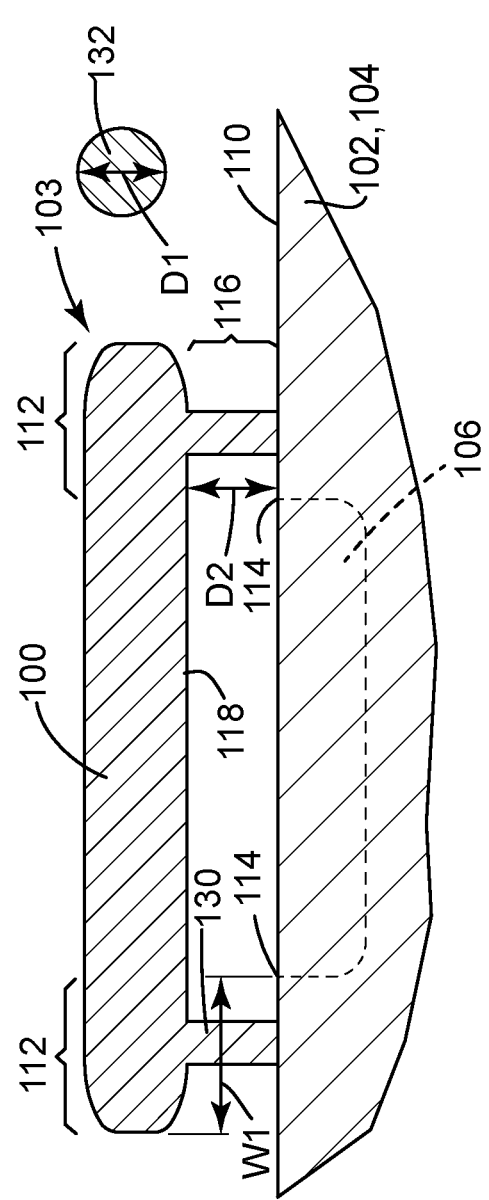
FIG. 2 shows a cross-sectional view of an additively manufactured structure including a mask, according to embodiments of the disclosure.
Figure 3:
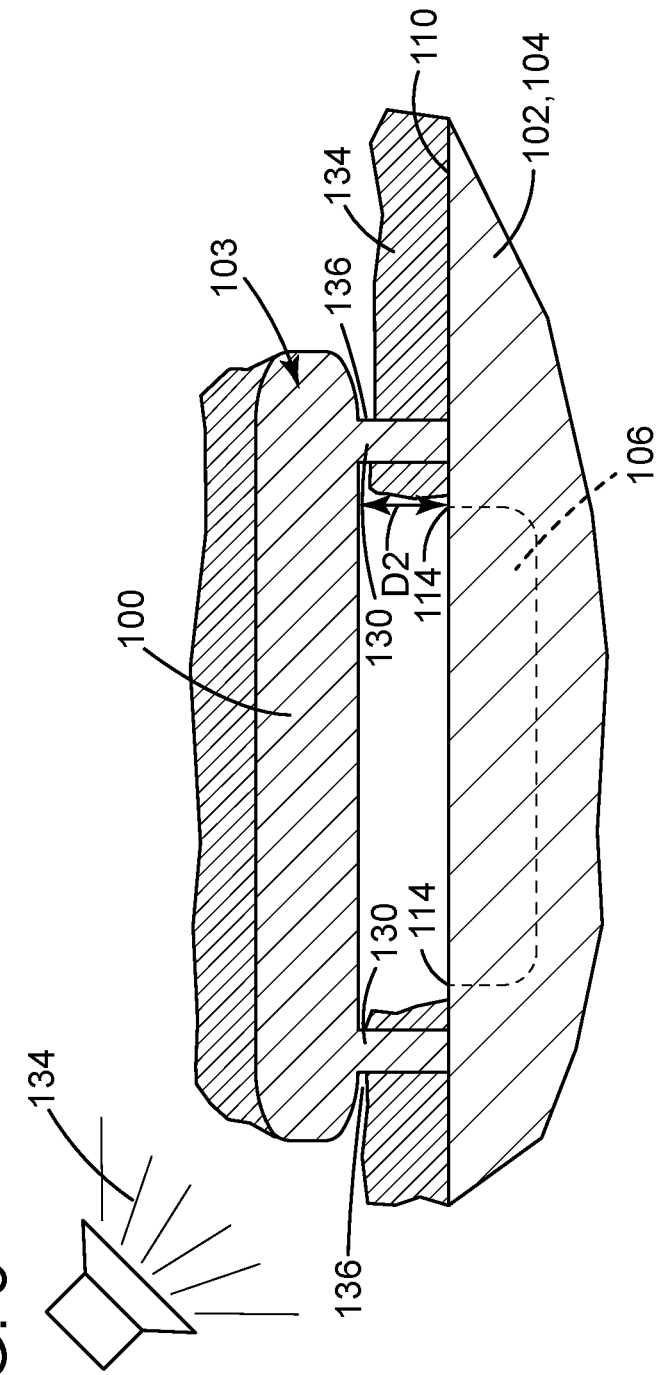
FIG. 3 shows a cross-sectional view of an additively manufactured structure including a mask with a coating thereon, according to embodiments of the disclosure.
Figure 5:
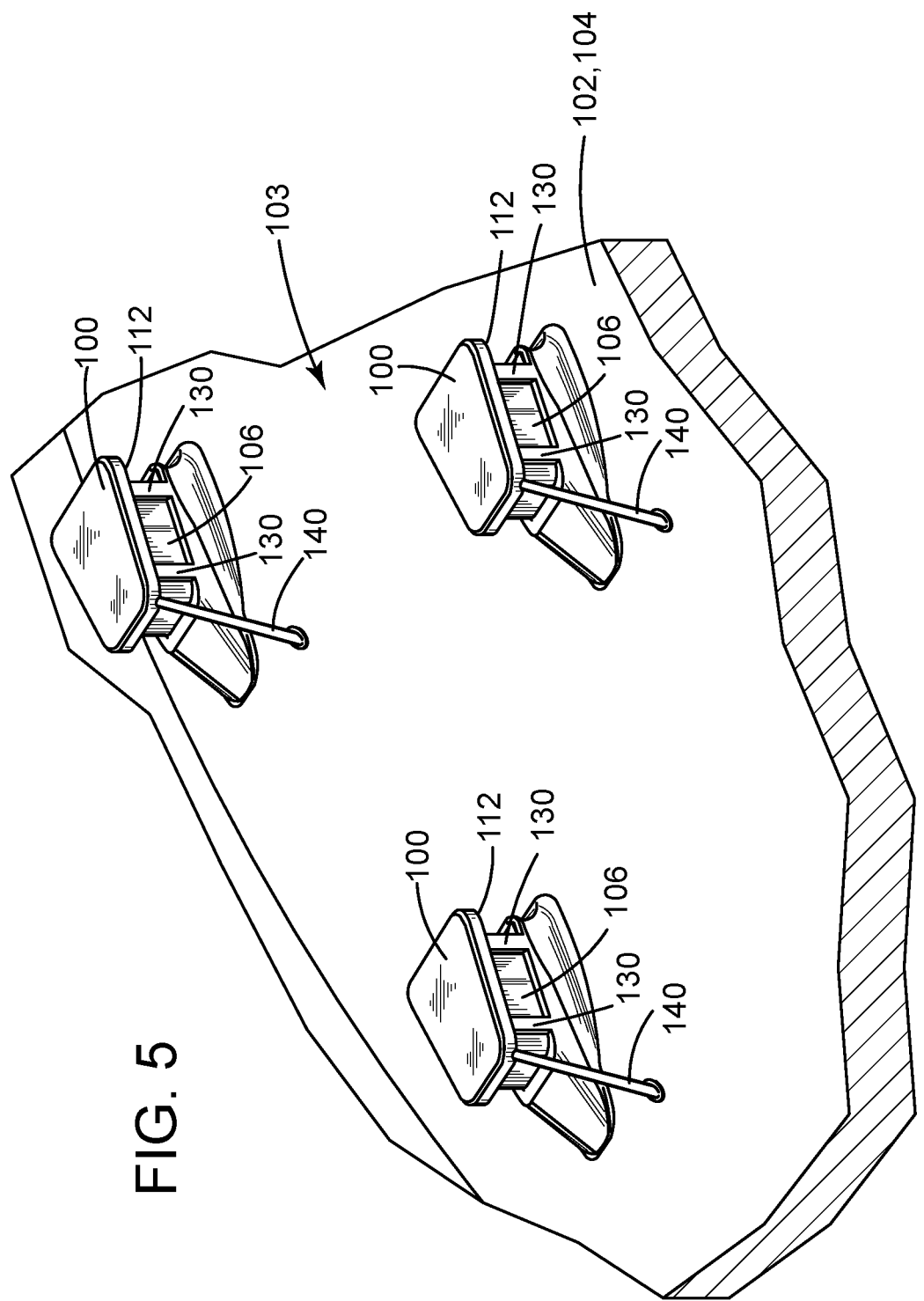
FIG. 5 shows a perspective view of an additively manufactured structure including a mask, according to yet other embodiments of the disclosure.

A mask 100 is positioned over each opening 106. Mask 100 has the shape of a respective opening 106, i.e., same cross-sectional shape as opening 106, at exterior surface 110. Hence, mask 100 may be, for example, rounded such as elliptical or oval (FIG. 1) or circular (FIGS. 4-5), polygonal (FIG. 5) (square, rectangular, trapezoidal, etc.), diffuser shaped, etc. As shown in FIGS. 1-3, mask 100, however, has an area that is larger than the area of opening 106, i.e., a cross-sectional area through it. In this manner, as shown best in the cross-sectional view of FIG. 2, mask 100 has an overhang 112 that extends over exterior surface 110 of body 104 outside and about opening 106. Overhang 112 also acts to create a gap 116 from an underside 118 of mask 100 to exterior surface 110 of opening 106. Underside 118 of mask 100 is spaced from exterior surface 110 of body 104 and over opening 106. Although not necessary in all instances, overhang 112 may extend to a uniform distance (W1) outwardly from an edge 114 of opening 106. This distance is dependent on the thickness of the coating as well as other variables such as the spray angle with the surface, size of coating particles, etc. As shown in FIG. 5, masks 100 of different shapes to accommodate openings 106 of different shapes on the same object 102 may be employed, where desired.

AM structure 103 also includes a plurality of support ligaments 130 coupled to mask 100 and exterior surface 110 of body 104 at a location adjacent to opening 106. Support ligaments 130 support mask 100 relative to exterior surface 110 of body 104. That is, each support ligament 130 is coupled to mask 100 and exterior surface 110 of body 104 at a location adjacent to opening 106 to support a portion of mask 100. As will be described, support ligaments 130 couples mask 100 to object 102 in a manner that allows easy removal of mask 100 from object 102. Support ligaments 130 generally extend vertically (perpendicular) between exterior surface 110 and underside 118 of mask 100; however, some angling from vertical may be used. Support ligaments 130 may have any cross-sectional shape, e.g., circular (FIG. 4), oval (FIG. 1), polygonal (FIG. 2) (square, rectangular, trapezoidal, etc.). In FIGS. 1-3, four support ligaments 130 are illustrated; however, any number of support ligaments 130 may be used, e.g., two or more. In certain embodiments, plurality of support ligaments 130 include at least one support ligament 130 on one side of opening 106, and at least one support ligament 130 on other side of the opening 106. As will be further described, support ligaments 130 are formed sufficiently small to allow breaking to remove mask 100, rather than having to machine the masks to remove them. It is noted that due to the limitations of certain additive manufacturing techniques, mask 100, support ligaments 130 and object 102 may not be necessarily formed in the same orientation as illustrated.

Support ligaments 130 also define a gap spacing D2 of gap 116, defined between underside 118 of mask 100 and exterior surface 110 of object 102. Gap 116 provides a number of advantages. In embodiments, as shown in FIG. 2, gap 116 has a dimension configured to prevent a peening material 132, e.g., grit, metal shot, ice, pellets, sand, etc., from passing therethrough. In this case, a minimum dimension D1 (e.g., diameter) of peening material 132 may be ascertained, and a gap spacing D2 sized to be sufficiently smaller than minimum dimension D1 to prevent peening material 132 from entering gap 116 and/or opening 106. In this manner, masks 100 can prevent damage to openings 106 that may otherwise occur from impact by peening material 132. In certain embodiments, as shown in the cross-sectional view of FIG. 3, gap spacing D2 may also have a size configured to prevent a coating 134 applied over mask 100 from bridging from a respective mask member 100 to coating 134 over exterior surface 110 of object 102. That is, a coating gap 136 exists in coating 134. Gap spacing D2 may be sized based on, for example, coating 134 material, application format, expected thickness, among other factors. As illustrated, while coating 134 coats object 102 and mask 100, it fails to enter opening 106 and thus does not coat or fill openings 106. Coating 134 also does not bridge mask 100 to object 102. In this manner, when mask 100 is removed, coating 134 does not require breaking to remove the mask, which could cause cracking where coating 134 extends over object 102. That is, there is no force applied to coating 134 on object 102, and thus there is no possibility of cracking of coating 132 on object 102. While gap spacing D2 may vary depending on peening material 132 and/or coating 134, in one non-limiting example, gap spacing D2 may be between 0.88 millimeters (mm) to 1.4 mm (0.035 to 0.055 inches). This range of dimensions would, for example, prevent coating 134 having a thickness between 1.40 mm and 1.52 mm from bridging from masks 100 to object 102, and would prevent 1.5 mm metal shot from lodging in gap 116 and impacting openings 106. Other dimensions are possible.

Referring to FIGS. 1 and 5, AM structure 103 may also optionally include an overhang support element 140 coupled to overhang 112 and exterior surface 110 of body 104 to support overhang 112 during additive manufacture. Overhang support element 140 addresses a challenge with additive manufacturing of an object where new layers being formed do not have any underlying layers of material for support, and support ligament(s) 130 are not positioned in a way to provide underlying support. In this case, the new layers may not be held down and can curl upwardly. Overhang support element(s) 140 can be provided anywhere necessary, i.e., where curling of mask 100 is anticipated. In contrast to support ligaments 130, overhang support element(s) 140 is more likely to be at a non-perpendicular angle relative to exterior surface 110 of body 104.

Figure 6:
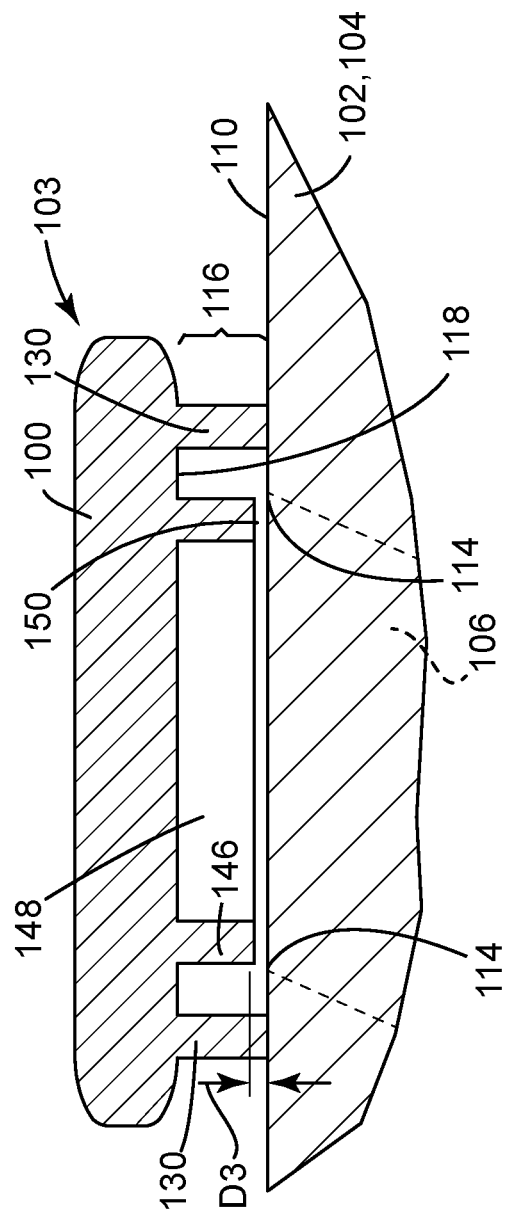
FIG. 6 shows a cross-sectional view of an additively manufactured structure including a mask with an optional skirt, according to embodiments of the disclosure.
Figure 7:
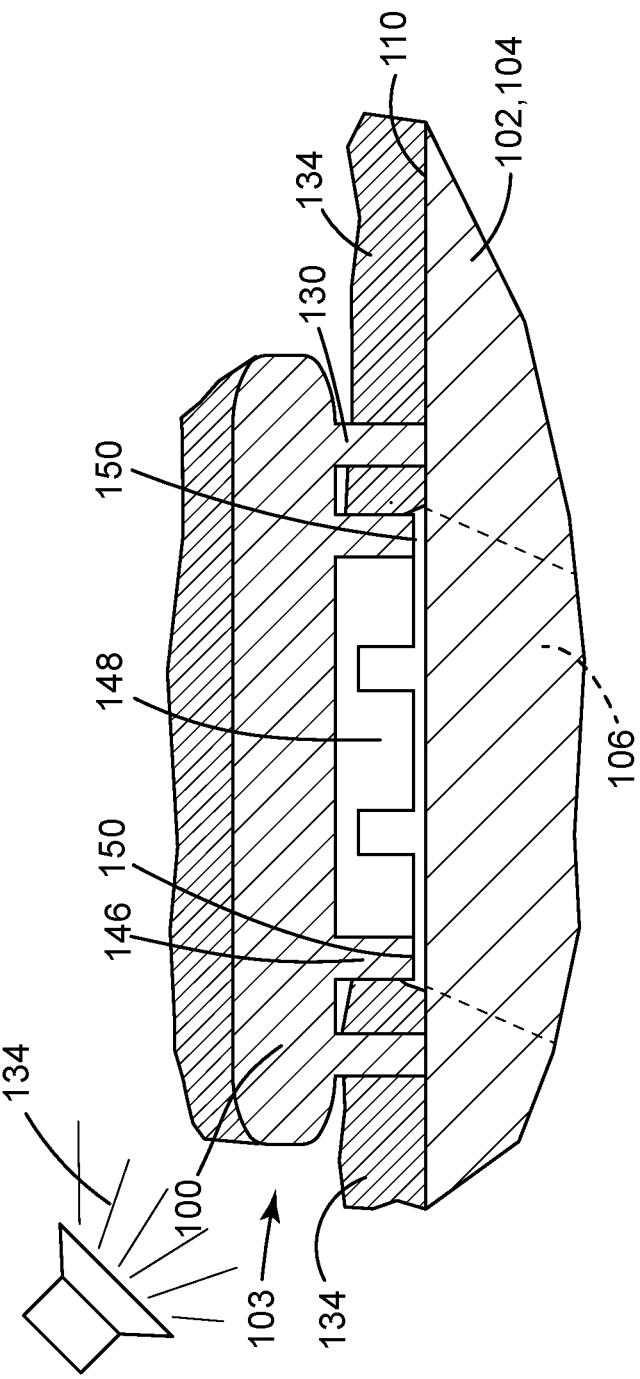
FIG. 7 shows a cross-sectional view of an additively manufactured structure including a mask with another optional skirt and a coating thereon, according to embodiments of the disclosure.

FIG. 6 shows a cross-sectional view of AM structure 103 with a mask 100 according to an alternative embodiment. In this embodiment, mask 100 includes underside 118 spaced from the exterior surface 110 of body 104 and over opening 106, as described previously. Gap 116 is thus present. In order to provide further protection for opening 106, mask 100 may include a skirt 146 extending from underside 118 toward opening 106. Skirt 146 is radially inward of support ligaments 130. Skirt 146 may include a wall 148 extending downwardly from underside 118 of mask 100 that is continuous (FIG. 6) or intermittent (FIG. 7). Wall 148 may have a cross-sectional shape that matches that of opening 106, e.g., ellipse, circle, etc., such that wall 148 follows the contour of edge 114 of opening 106. Wall 148 of skirt 146 has a lower end 150 that is over opening 106, and has a skirt spacing D3 from exterior surface 110 of body 104. Skirt spacing D3 may be, for example, between 0.050 millimeters and 0.500 millimeters, which as shown in the cross-section of FIG. 7, prevents coating 134 from entering opening 106.

In some cases, lower end 150 may fuse to exterior surface 110, but the bond is sufficiently weak to allow easy removal of mask 100 from body 104.

Figure 8:
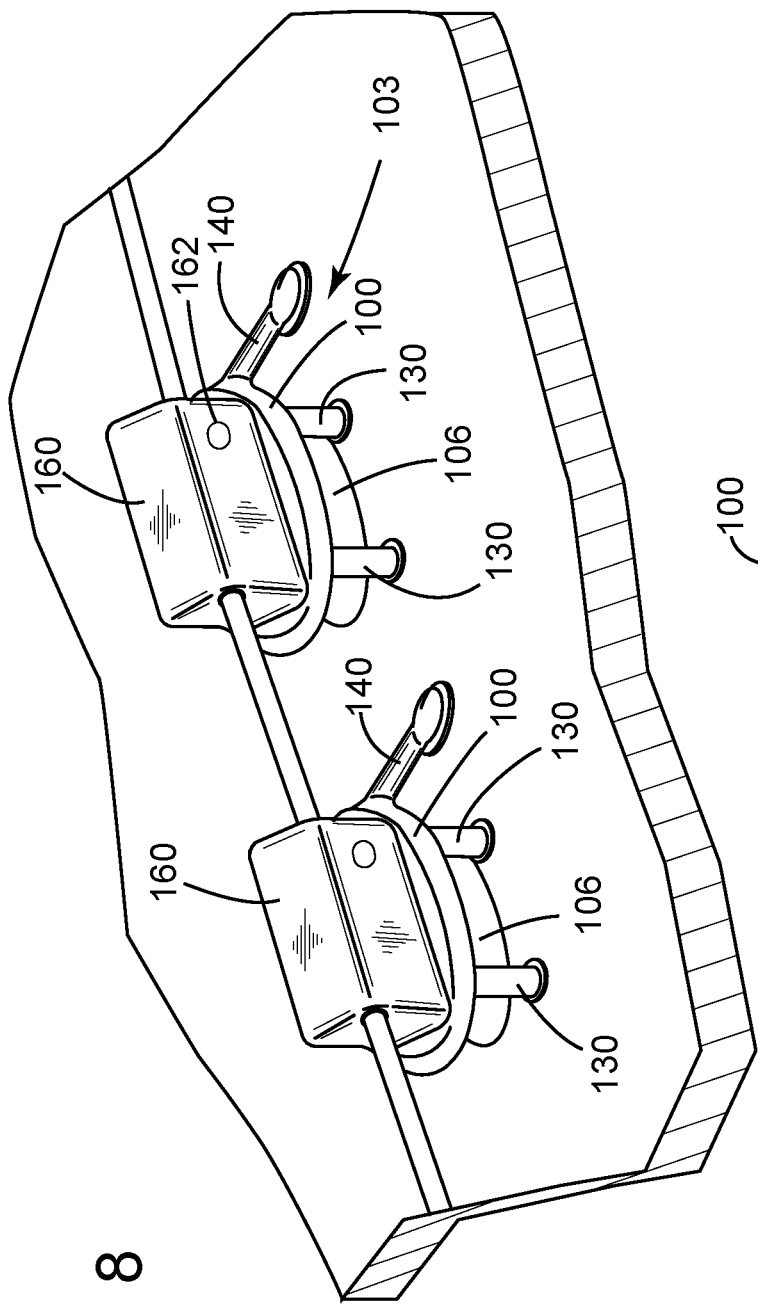
FIG. 8 shows a perspective view of an additively manufactured structure including a mask with an optional detachment member, according to embodiments of the disclosure.

Referring to FIG. 8, in certain embodiments, mask 100 may also include a detachment member 160 extending from mask(s) 100. Detachment member 160 may include any structure capable of being engaged and manipulated to remove mask 100 from object 102 by breaking support ligament(s) 130, and any overhang support elements 140. Detachment member 160 may include, for example, a squared off end capable of grasping by a tool (not shown), e.g., channel lock pliers, adjustable wrench, etc. In addition thereto, or alternatively, detachment member 160 may include a tool receiving feature 162 therein configured to receive a tool (not shown) such as but not limited to a pry bar, screwdriver, channel lock pliers, adjustable wrench, etc. Tool receiving feature 162 may have any shape and/or size to prevent coating 134 (FIGS. 3 and 7) from filling it. In any event, detachment member 160 is capable of manipulation using the tool or manually to apply a force that break support ligaments 130 and any overhang support elements 140, thus allowing removal of mask 100. Detachment member 160 may have any desired vertical height from mask 100.

Figure 9:
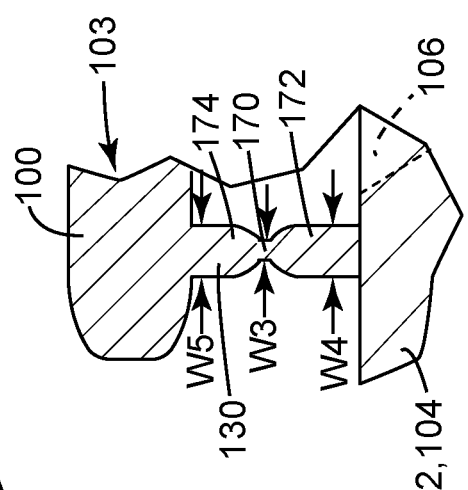
FIG. 9 shows a partial cross-sectional view of an additively manufactured structure including a mask with an optional removal link in a support ligament, according to embodiments of the disclosure.

With further regard to support ligaments 130, as shown in FIG. 1, each support ligament 130 may have uniform width W2 along a length thereof that allows for its easy detachment, and thus mask 100 detachment, from object 102. While support ligament(s) 130 have been illustrated herein as linear elements having a particular cross-section, it is understood that they may take a variety of structural forms not illustrated. That is, a uniform width W2 is not necessary in all cases as it may be advantageous for support ligament(s) 130 to taper or narrow to foster breaking. For example, FIG. 9 shows support ligament(s) 130 including a removal link 170 along a length of the support ligament(s) 130. Removal link 170 includes a smaller width W3, i.e., lateral cross-sectional dimension, than the rest of support ligament 130, creating a location of weakness in the support ligament. More specifically, a lower portion 172 of support ligament 130 is integrally coupled to object 102 and has a first width W4, and an upper portion 174 above lower portion 172 having a second width W5 that is wider than first width W4. In various implementations, lower portion 172 may be embodied as and/or referred to as a pedestal, pin, base member, etc., with a distinct geometry as compared to upper portion 174. Removal link 170 is positioned between lower and upper portions 172, 174. The smaller width W3 of removal link 170 makes it easier to break support ligament 130, and allows for customization of where support ligament 130 breaks and how much of each support ligament 130 remains extending from exterior surface 110 of body 104. Removal link 170 can take a variety of alternative forms, e.g., shapes, sizes, etc., not illustrated herein, but considered within the scope of the disclosure. In one non-limiting example, support ligament(s) 130 may have a width W2 (FIG. 1), W4, W5 ranging from 0.125 mm to 1.000 mm and removal link 170 may have a width W3 from 0.01 mm to 0.150 mm. The widths can vary depending on a large number of factors including but not limited to: object and mask material, size of object 102, size of openings 106, desired force to remove the mask, expected tools to be used, etc.

Mask 100 may be made of the same material as object 102. Consequently, the material may depend on the object's application. In one embodiment, mask 100 and object 102 may be made of a metal, which may include a pure metal or an alloy. For example, where object 102 is a turbine blade, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). Alternatively, object 102 and mask 100 may be made of, for example, a plastic, a ceramic, combinations thereof, etc. As noted, mask 100 and object 102 may be made of additive manufacturing (e.g., DMLM, SLM, 3D printing, etc.) technique that will vary depending on the material. In any case, object 102, support ligament(s) 130, overhang support elements 140 and detachment member 160, will include a plurality of integral material layers, created by the additive manufacturing.

Figure 10:
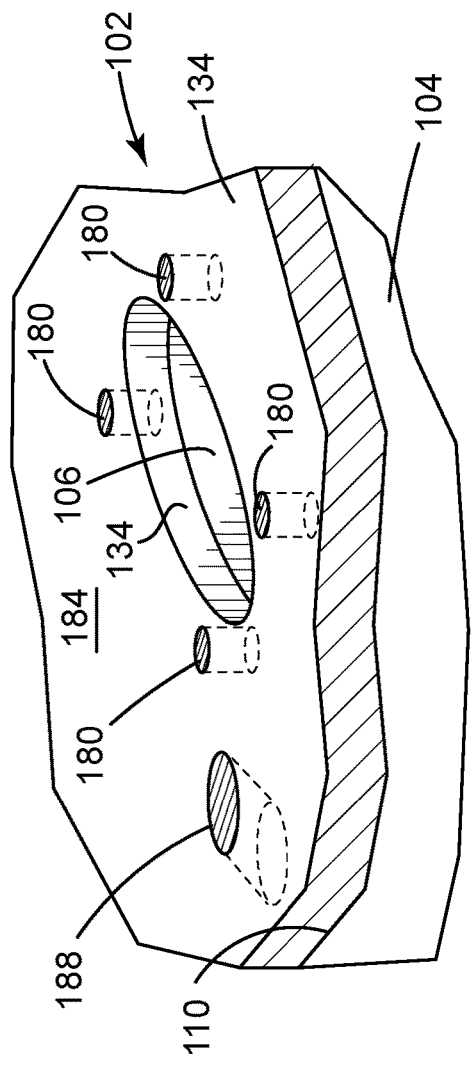
FIG. 10 shows a perspective view of an additively manufactured object with a coating, according to embodiments of the disclosure.
Figure 11:
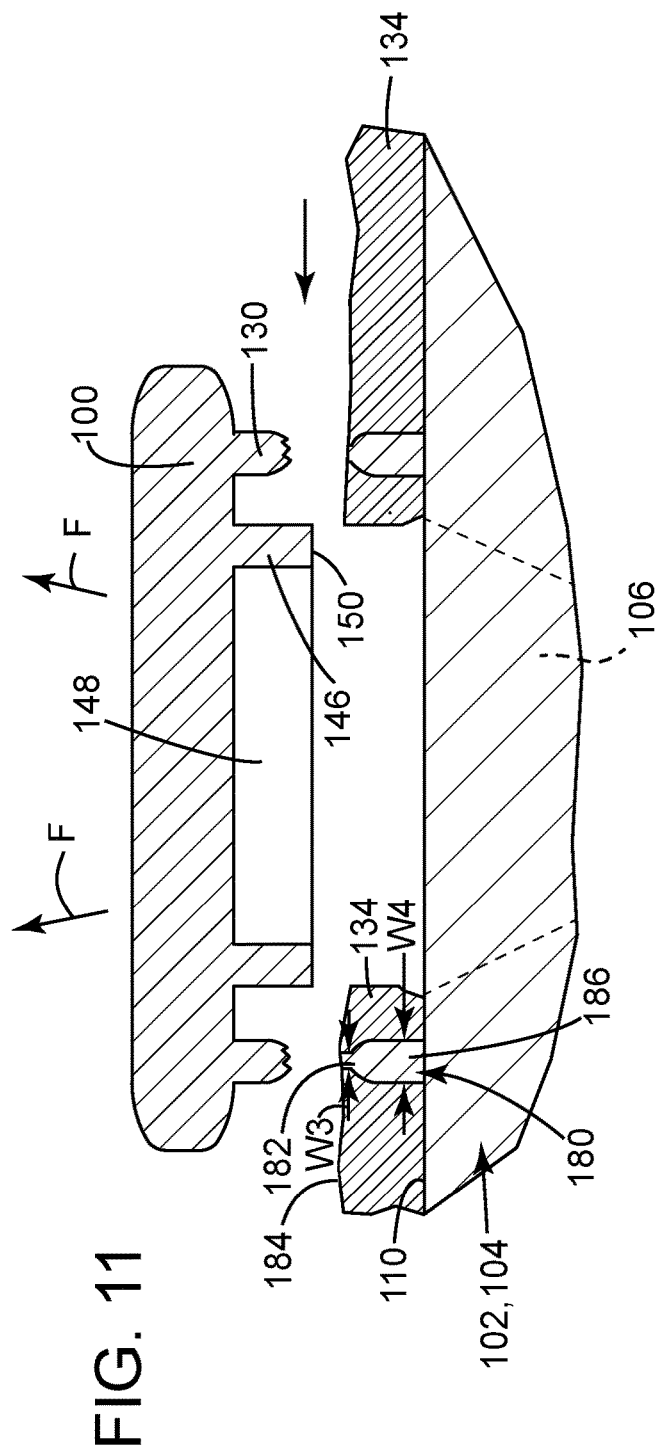
FIG. 11 shows a cross-sectional view of removing a mask from an additively manufactured structure, according to embodiments of the disclosure.

As shown in FIG. 10, embodiments of the disclosure also include an additively manufactured (AM) object 102, i.e., with mask 100 removed. Object 102 includes body 104 including opening 106 in exterior surface 110 thereof. As noted, opening 106 has a shape and a first area at exterior surface 110 of body 104. Object 102 also includes coating 134 on exterior surface 110 of body 104. In contrast to conventional AM objects, object 102 includes a plurality of ligament elements 180 extending from exterior surface 110 of body 104 and through coating 134 adjacent opening 106. Ligament elements 180 are remnants of support ligaments 130 that remain after mask 100 is removed. As illustrated, each ligament element 180 is at least partially surrounded by coating 134. In certain embodiments, at least one ligament element 180 is on one side of opening 106, and at least one ligament element 180 is on the other side of opening 106. As shown in FIG. 11, where support ligaments 130 include removal link 170 as in FIG. 9, an outer portion 182 of each ligament element 180 at exterior surface 184 of coating 134 may have a smaller width W3 than an inner portion 186 of each ligament element 180 within coating 134. Outer portion 182 of ligament element 180 corresponds to removal link 170 (FIG. 9) and inner portion 182 corresponds to lower portion 172 (FIG. 9) of support ligament 130 (FIG. 9). As shown in FIG. 10, where overhang support elements 140 are employed, object 102 may also include a portion 188 of overhang support element 140 (FIG. 1) in exterior surface 184 of coating 134 after removing mask 100.

Embodiments of the disclosure may also include a method for additively manufacturing object 102. As shown in, for example, FIG. 1, the method may include additively manufacturing object 102, as described herein. As noted, object 102 may include body 104 including opening 106 in exterior surface 110 of body 104. Opening 106 has a shape and a first area at exterior surface 110 of body 104 that is mimicked by mask 100 positioned over opening 106. That is, mask 100 has the shape of opening 106. In non-limiting examples, opening 106 and mask 10 are elliptical (FIG. 1) in shape and/or trapezoidal (FIG. 3) in shape. As noted, mask 100 has a second area that is larger than the first area so overhang 112 of mask 100 extends over exterior surface 110 of body 102 about opening 106. Object 102, prior to removal of mask 100, includes plurality of support ligaments 130. Each support ligament 130 is coupled to mask 100, i.e., underside 118 thereof, and exterior surface 110 of body 104 at a location adjacent to opening 106 to support a portion of mask 100.

The additive manufacturing may also optionally include additively manufacturing overhang support element(s) 140 coupled to overhang 112 and exterior surface 110 to support the overhang. A portion 188 (FIG. 10) of overhang support element 140 may be in exterior surface 184 of coating 134 after removing mask 100. If desired, overhang support element 140 may be removed prior to coating. As shown in FIG. 8, the additive manufacturing may also optionally include additively manufacturing detachment member 160 extending from mask 100. As noted, mask 100 includes underside 118 spaced from exterior surface 110 and over opening 106. As shown in FIGS. 6 and 7, the additive manufacturing may also optionally include additively manufacturing skirt 146 extending from underside 118 toward opening 106. Skirt 146 has lower end 150 having a skirt spacing D3 from exterior surface 110 of body 104 and opening 106.

The additive manufacturing may include any process described herein. For example, the additive manufacturing may include DMLM, including: providing a metal powder bed within a processing chamber; controlling a flow of a gas mixture within the processing chamber from a source of inert gas and a source of an oxygen containing material, the gas mixture including the inert gas and oxygen from the oxygen containing material; and sequentially melting layers of metal powder on the metal powder bed to generate object 102. As DMLM is a well known additive manufacturing process, no further details or illustration are necessary. Other additive manufacturing processes may also be employed.

As shown in FIGS. 3 and 7, the method may further include applying coating 134 over exterior surface 110 of body 104 including mask 100. In an optional step, the method may include, as shown in FIG. 2, applying peening material 132 to exterior surface 110 of body 104, before applying the coating. In this case, peening material 132 has minimum dimension D1, and gap spacing D2 from exterior surface 110 of body 104 is smaller than minimum dimension D1 to prevent peening material 132 from entering opening 132. Illustrative dimensions of D1 and D2 were previously stated. As noted, coating 134 does not span an entirety of gap 136 from underside 118 of mask 100 to exterior surface 110 of body 104. Coating 134 may be applied using any technique appropriate for the coating. Illustrative spray application processes include, but are not limited to, plasma spraying both in air and vacuum, cold spraying, electrostatic spraying, electron beam physical vapor disposition, chemical vapor deposition, thermal spraying, high-velocity oxy-fuel coating, physical vapor disposition, combinations thereof, and other spraying techniques now known or hereinafter developed.

FIG. 11 shows a cross-sectional view of removing mask 100. As noted, a portion of at least one of the plurality of support ligaments 130 (FIG. 1), i.e., a ligament element 180, is in exterior surface 184 of coating 134. Mask 100 may be removed using any of a variety of techniques, but because of mask 100 arranged according to embodiments of the disclosure, it does not need to include machining. Removing mask 100 may include, for example, applying a force F to mask 100 or, where provided, detachment member 160 (FIG. 8). Removing mask 100 may include, for example, cutting plurality of support ligaments 130, e.g., with any mechanism for cutting or otherwise fatiguing the ligaments. As shown in FIG. 11, removing mask 100 may also include removing, where provided, skirt 146. It is noted that no machining is required to remove mask 100.

As indicated above, the disclosure provides an integrated opening mask 106 with the printed object 102 to prevent clogging and/or bridging of openings, e.g., cooling holes, by coating 134, e.g., TBC or other post machining coating. Mask 100 has the shape of opening 106 at exterior surface 110 and is attached to exterior surface 110 via multiple support ligaments 130, like table legs. Embodiments of the disclosure reduces the time required to mask the openings prior to coating and to clean out holes post-coating.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An additively manufactured (AM) structure, comprising:
    an object including a body including an opening in an exterior surface thereof, the opening having a first area at the exterior surface of the body;
    a mask positioned over the opening, the mask having a second area that is larger than the first area so as to overhang the exterior surface of the body above the opening;
    a plurality of support ligaments, each support ligament coupled to the mask and the exterior surface of the body at a location adjacent to the opening to support a portion of the mask; and
    a detachment member extending from the mask,
    wherein the opening is exposed by a gap spacing between an underside of the mask and the exterior surface of the body and over the opening.

2. The AM structure of claim 1, wherein the plurality of support ligaments are breakable to remove the mask therefrom.

3. The AM structure of claim 1, further comprising an overhang support element coupled to the overhang and the exterior surface of the body to support the overhang during additive manufacture.

4. The AM structure of claim 1, wherein the opening and the mask are one of: elliptical in shape and trapezoidal in shape.

5. The AM structure of claim 1, further comprising a skirt extending from the underside of the mask toward the opening, the skirt having a lower end defining a skirt spacing from the exterior surface of the body, wherein the lower end of the skirt is over the opening.

6. The AM structure of claim 5, wherein the skirt spacing is between 0.050 millimeters and 0.500 millimeters.

7. The AM structure of claim 1, wherein at least one support ligament includes a removal link along a length of the at least one of the plurality of support ligaments, the removal link having a smaller lateral, cross-sectional dimension than the rest of the at least one of the plurality of support ligaments.

8. The AM structure of claim 1, wherein the plurality of support ligaments includes at least one support ligament on one side of the opening, and at least one support ligament on another side of the opening.

9. An additively manufactured (AM) structure, comprising:
an object including a body including an opening in an exterior surface thereof, the opening having a first area at the exterior surface of the body;
a mask positioned over the opening, the mask having a second area that is larger than the first area so as to overhang the exterior surface of the body above the opening;
a plurality of support ligaments, each support ligament coupled to the mask and the exterior surface of the body at a location adjacent to the opening to support a portion of the mask; and
a skirt extending from an underside of the mask toward the opening, the skirt having a lower end defining a skirt spacing from the exterior surface of the body, wherein the lower end of the skirt is over the opening, wherein the opening is exposed by a gap spacing between the underside of the mask and the exterior surface of the body and over the opening.

10. The AM structure of claim 9, wherein the plurality of support ligaments are breakable to remove the mask therefrom.

11. The AM structure of claim 9, further comprising an overhang support element coupled to the overhang and the exterior surface of the body to support the overhang during additive manufacture.

12. The AM structure of claim 9, wherein the opening and the mask are one of: elliptical in shape and trapezoidal in shape.

13. The AM structure of claim 9, wherein the skirt spacing is between 0.050 millimeters and 0.500 millimeters.

14. The AM structure of claim 9, wherein at least one support ligament includes a removal link along a length of the at least one of the plurality of support ligaments, the removal link having a smaller lateral, cross-sectional dimension than the rest of the at least one of the plurality of support ligaments.

15. The AM structure of claim 9, wherein the plurality of support ligaments includes at least one support ligament on one side of the opening, and at least one support ligament on another side of the opening.

* * * * *